Feb. 3, 1970 W. D. HOUGHTON 3,493,674

TELEVISION MESSAGE SYSTEM FOR TRANSMITTING AUXILIARY INFORMATION DURING THE VERTICAL BLANKING INTERVAL OF EACH TELEVISION FIELD

Filed May 18, 1966 4 Sheets-Sheet 1

INVENTOR.
WILLIAM D. HOUGHTON
BY Eugene M. Whitacre
Attorney

Feb. 3, 1970 W. D. HOUGHTON 3,493,674

TELEVISION MESSAGE SYSTEM FOR TRANSMITTING AUXILIARY INFORMATION DURING THE VERTICAL BLANKING INTERVAL OF EACH TELEVISION FIELD

Filed May 18, 1966 4 Sheets-Sheet 2

INVENTOR.
WILLIAM D. HOUGHTON
BY Eugene M. Whitacre
Attorney

TELEVISION MESSAGE SYSTEM FOR TRANSMITTING AUXILIARY INFORMATION DURING THE VERTICAL BLANKING INTERVAL OF EACH TELEVISION FIELD

Filed May 18, 1966 4 Sheets-Sheet 3

INVENTOR.
WILLIAM D. HOUGHTON
BY Eugene M. Whitacre
Attorney

INVENTOR.
WILLIAM D. HOUGHTON
BY
Eugene M. Whitacre
Attorney 3,493,674
Patented Feb. 3, 1970

3,493,674

TELEVISION MESSAGE SYSTEM FOR TRANSMITTING AUXILIARY INFORMATION DURING THE VERTICAL BLANKING INTERVAL OF EACH TELEVISION FIELD

William D. Houghton, Princeton, N.J., assignor to RCA Corporation, a corporation of Delaware Continuation-in-part of application Ser. No. 459,809, May 28, 1965. This application May 18, 1966, Ser. No. 551,084
Int. Cl. H04n 7/00, 3/00
U.S. Cl. 178—5.6 28 Claims

ABSTRACT OF THE DISCLOSURE

Auxiliary message information is transmitted to the public using existing television facilities, but without interferring wth regular primary television program service. The auxiliary information is transmitted during the vertical blanking interval of each field of primary program information at the rate of one video scan line of message per field of program information.

The auxiliary matter is further identified by a unique category code. Reproduction of desired auxiliary messages is achieved by the viewer by conditioning his receiver unit to respond only to that message associated with the particular code signal which he selects.

This is a continuation-in-part of application Ser. No. 459,809 now abandoned, filed May 28, 1965.

This invention relates to a television message system and, more particularly, to a system which utilizes existing television facilities to transmit special messages to the public without interfering with regular television program service.

The suggestion that additional video message information could be added to a standard broadcast video signal can be found in many places in the prior art. Many arrangements for implementing this suggestion can similarly be found. However, each of these arrangements, by and large, had associated with it some inherent limitation which precluded it from use as an additional television service for the general public.

(A) One such arrangement proposed to interrupt the program video signal for one complete television field or frame interval and to introduce during that interval, additional message information from a different video signal source. A significant argument raised in opposition to that proposal was that the interruptions of the program video signal were quite noticeable, even for times as short as one field interval. Furthermore, if many such interruptions occurred within a short space of time, they could easily become quite objectionable.

(B) A second such arrangement, disclosed by Beers in Patent No. 2,874,213, proposed to remove all of the vertical blanking and synchronizing information from the program video signal and to insert a message signal from a second television system in its place. This composite signal would then be sent out over the airways. At the message receiving location, the message signals would be separated from the composite signal by properly timed gating networks. A significant argument opposing that proposal was that the composite signals containing the message information could not be broadcast to the general public because the absence of vertical synchronizing signals would cause their home receivers to lose vertical lock. Such an arrangement was, therefore, not compatible with standard television broadcast services.

(C) A third such arrangement, disclosed in Patent

No. 3,017,457 by Johnson, proposed to add a 25 line per frame interlaced message by making use of the last 12½ horizontal lines in each vertical blanking interval. Since these message lines would appear above the top of the television picture, they would not be observed because they would be behind the tube mask. While this proposal overcame the signal interruption limitation of the first arrangement and the synchronizing irregularities of the second, it was not without its own limitations: first, the added message was limited to a vertical height of 25 lines per picture and, hence, would provide only strip type messages; and second, because the added message was in coherent form at the top of the picture, it could very well disturb the television viewer whose set was misadjusted to show the top of the picture just below the mask.

Nevertheless, the concept of adding extra information to a video signal is still an attractive one. If the message signals could be added to the program signal at the television broadcast studio, they could be transmitted directly to the public over existing network facilities. Some examples for this use might include national civil defense information, national disaster control information, and stock market quotations. If the message signals could be added to the program signal at remote stations along the network, the system could be used to provide local information: of sales listings, of weather forecasts, of traffic conditions, and of any other information which would be of interest to a local audience. These uses can, of course, be controlled by the broadcaster who could sell this additional television space to sponsors for special message services.

It is an object of the present invention, therefore, to provide a television message system which utilizes existing television facilities to transmit special video messages to the public without interfering with regular television program service.

It s another object of the invention to provide such a system in which the special messages can be added to the program video signal either at the television broadcast studio or at local stations along the television network.

It is an additional object of the invention to provide such a system which is capable of producing permanent records of the message signals received.

It is a further object of the invention to provide such a system which is completely compatible with existing television receiving equipment.

As will become clear hereinafter, a system embodying the invention transmits a message signal at the rate of one line per message per field of image information along with receiver synchronizing signals. More particularly, the message signal may be broken up into separate television lines, each of which may then be sequentially added to the synchronizing signals at a line per field rate to form composite signals for transmission. Thus, 525 field intervals would be required to transmit a 525 line message frame, for example. A special receiving unit is set up to receive the added messages, and does this by selecting the individual message lines from the composite signal as they are received and by sequentially storing them in a memory network, each of which is also performed at the same line per field rate as the transmission. After the complete message frame is stored in the memory, it can be read out and viewed as a transient type display on a television receiver screen or on a separate storage type cathode ray tube. If desired, hard copy prints can be made using photographic film, Electrofax paper, or other permanent reproducing devices with other embodiments of the message system.

As will also become clear hereinafter, the range of use of a message system embodying the invention can be extended by transmitting message code signals in addition to the auxiliary message information. These code signals may exist as bursts of energy of differing frequencies to indicate the type of message being transmitted or as a series of pulses representing a digital code. The receiving unit of such an expanded system can then be conditioned by the viewer to respond only to those code signals which tag the messages which are of particular interest to him.

As will additionally become clear hereinafter, one system embodying the invention transmits message information and code information during the vertical blanking portion of a regular television program signal while a second transmits these informations at other intervals.

For a better understanding of the present invention, together with further objects thereof, reference is had to the following description taken in connection with the accompanying drawings, and its scope will be pointed out in the appended claims.

Referring to the drawings.

Figure 1:
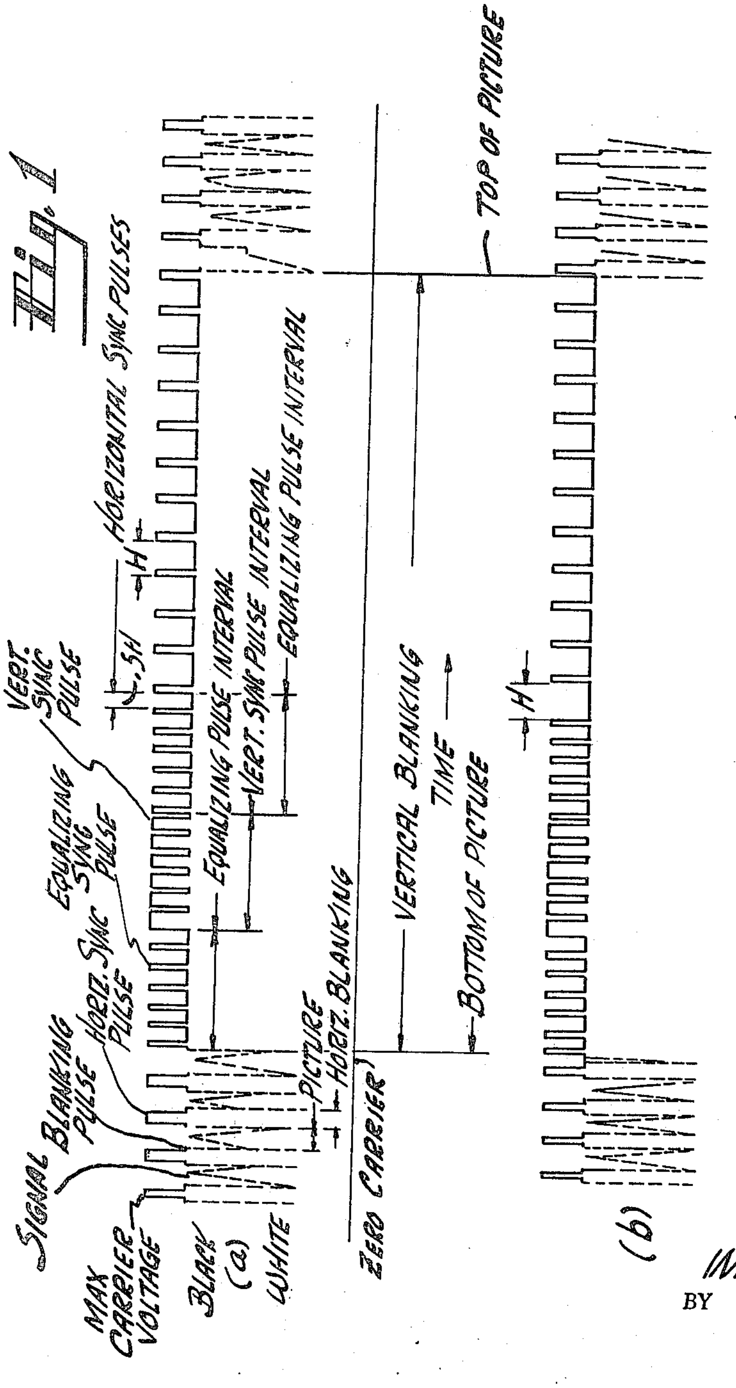
FIGURE 1 is a series of curves illustrating the vertical blanking interval for alternate fields of an interlaced television signal.

Referring now to FIGURE 1 in more detail, the curves (*a*) and (*b*) there shown illustrate respectively the vertical blanking interval for the two alternate fields of the interlaced television signal used in the United States. As is well known, each of these intervals include equalizing pulses, horizontal synchronizing pulses, and serrated vertical synchronizing pulses. The equalizing pulses function to maintain vertical synchronization of a television receiver even though two out of step or interlaced scanning fields are utilized, while the horizontal synchronizing pulses maintain horizontal synchronization of the receiver during the latter portion of each of the vertical blanking intervals. The serrated vertical synchronizing pulses maintain horizontal synchronization of the receiver during vertical retrace.

As has been previously mentioned, that television multiplex system described in the prior art which removes all of this vertical blanking and synchronizing information and inserts an auxiliary message in its place proves to be incompatible with standard television broadcast services because of synchronizing irregularities. A system embodying the present invention, however, inserts the auxiliary video message information into the space or interval between successive horizontal synchronizing pulses during the vertical blanking interval and does not adversely affect synchronization. Since the television receiver is blanked during this interval, the message video information, which would otherwise be displayed behind the tube mask, is not displayed at all and thus does not interfere with the picture as seen by the televiewer.

Figure 2:
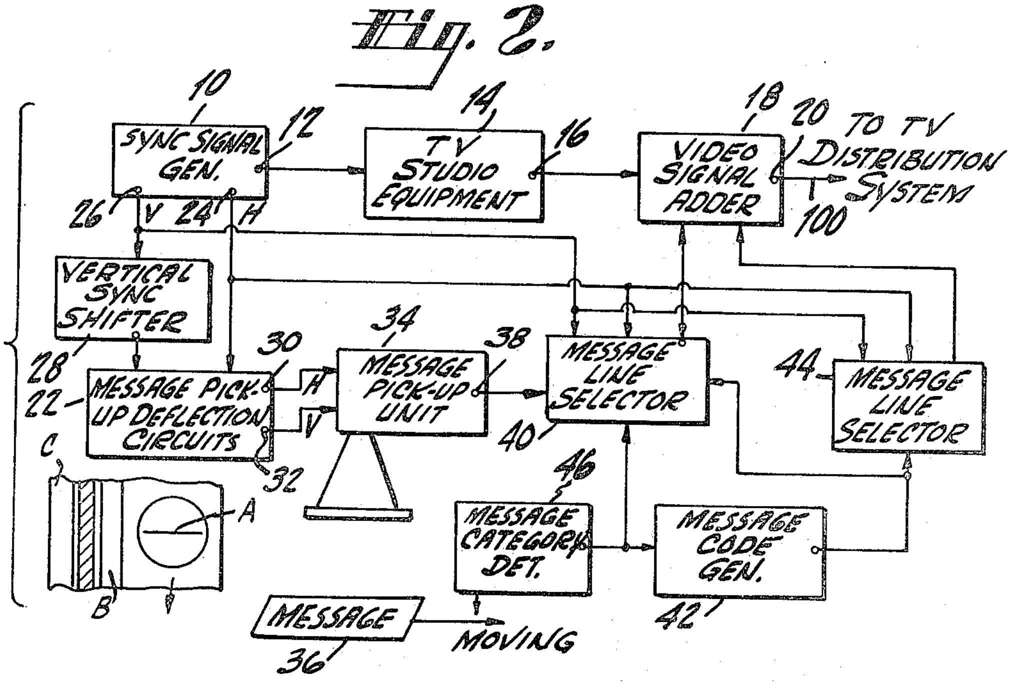
FIGURE 2 is a block diagram showing one arrangement for the transmitting portion of the message system for use at a television broadcast studio or at other locations where the program video signal originates.

Referring now to FIGURE 2, the transmitting portion of the television message system there shown includes a synchronizing signal generator 10 of suitable construction. Generator 10 develops and supplies at its output terminal 12, drive pulses for the conventional television studio equipment, represented as the unit 14. Unit 14 may include a camera chain, a film chain, a slide scanner, a tape recorder, or any other piece of television studio equipment capable of producing a video signal. The video signal developed by unit 14 at its output terminal 16 is the regular television signal and will hereinafter be referred to as the program signal. This program signal is coupled to a video signal adder 18 wherein it is combined with a single line video message signal, provided in a manner to be described below. The combined signal appears at output terminal 20 of the adder 18 and is a composite signal in the sense that it comprises a regular program signal during the picture interval of the combined signal and an added single line message signal during the vertical blanking interval. The composite video signal developed by the adder 18, at its output terminal 20, is coupled by means of a cable 100 either to a television broadcast transmitter or to any other standard television signal distribution network. The signal is then transmitter out over the airways in the usual manner.

The synchronizing signal generator 10 also develops synchronizing pulses for a message pick-up deflection circuit unit 22, which includes conventional horizontal and vertical rate deflection signal generators. The horizontal synchronizing pulses are developed at output terminal 24 of the generator 10 and are coupled directly to the horizontal deflection signal generator in unit 22. The vertical synchronizing pulses are developed at output terminal 26 of the generator 10 and are coupled to the vertical deflection signal generator in unit 22 through a vertical synchronizing pulse phase shifter 28.

The horizontal and vertical deflection signals developed by the message pick-up deflection signal generators in unit 22, at its output terminals 30 and 32, respectively, are coupled to the message pick-up unit 34. These signals drive the pick-up unit 34 just as the signals developed by the generator 10 at its output terminal 12 drive the television studio equipment 14. The message pick-up unit 34 may include a vidicon type television camera, a slide scanner, or any other type of conventional video pick-up device. As shown in FIGURE 2, the pick-up unit 34 is focused onto a message 36 which is drawn in front of the pick-up unit 34 by a motorized belt or other such similar arrangement (not shown). As was previously mentioned, this message may comprise information of national interest—disaster control, civil defense, or the like. The video message signals developed by the pick-up unit 34, at its output terminal 38, are coupled to a message line selector 40.

The message line selector 40 is a gated unit which sequentially selects a predetermined line of the video message signal from the output signal developed by the message pick-up unit 34. This message signal line is then coupled to the video signal adder 18 for distribution along the airways with the program signals. The gating of the selector unit 40 is controlled by an internally generated enabling pulse which bears a predetermined time position relative to the vertical pulse developed at output terminal 26 of the synchronizing signal generator 10 and coupled to the unit 40 along with the horizontal pulse developed at the output terminal 24. This enabling pulse is timed to coincide with that space or interval between successive horizontal synchronizing pulses during the vertical blanking interval into which the video message signal is to be inserted. The timing and coincidence of this enabling pulse may be manually controlled at the television broadcast studio in accordance with a predetermined schedule of message space allocations.

The vertical synchronizing pulse phase shifter 28 of FIGURE 2 includes a pulse delay network selected to provide a constant phase shift to the vertical synchronizing pulses from the synchronizing signal generator 10 such that the single line video message signal selected by the unit 40 occurs during its field interval at a point where introduced focus problems are minor, for example, near the middle of the field interval. This phase shift, together with the movement of the message 36 in front of the pick-up unit 34, is such that different and relatively distortion-free lines of message signal information are inserted into that horizontal space of each vertical blanking interval coinciding with the predetermined position of the enabling pulse generated within selector unit 40.

By sequentially inserting the message line signals into a selected space between consecutive horizontal synchronizing pulses in this manner, the message information can be transmitted, along with the program information as part of a compatible system. The particular interval actually used will depend upon the timing of the enabling pulse generated within the message line selector unit 40. One interval which was satisfactorily used in one construction of the message system corresponded to the horizontal line that is two lines up from the top of the television picture. The speed at which the message 36 is moved past the pick-up unit 34 determines the vertical resolution capabilities of the message system.

With the arrangement as thus far described, it will be noted that all types of auxiliary message information may be inserted into the same period in the vertical blanking interval of the program signal. In other arrangements it may be desirable to allocate different horizontal intervals for different types of message information. For example, one interval may carry only disaster control information, another only civil defense information, etc. As will subsequently become clear, such message space allocation permits the televiewer to select the particular type of auxiliary information he desires to have displayed. That is, by properly addressing his receiving unit to read out the information contained in one horizontal interval, he can display that information to the exclusion of all others being transmitted. Such message space allocation can be controlled at the television studio by changing the time coincidence between the enabling pulse generated within the message line selector unit 40 and the various horizontal synchronizing pulse intervals of the vertical blanking interval.

It may also be desired in certain arrangements to transmit more than one type of auxiliary information in a given horizontal period of the vertical blanking interval. Such a situation most obviously occurs when there are more types of messages to be transmitted than there are spaces available. To enable the televiewer to distinguish the type of message contained within a particular horizontal interval from all other types of messages programmed for that same space which may be present, the transmitting portion of the message system of FIGURE 2 also includes a coding arrangment including a message code generator 42 and a second message line selector unit 44. The message code generator 42 assigns a different message code, e.g. a burst of energy of different frequency or a series of pulses of different position, for each type of message to be transmitted while the message line selector unit 44 is a gated unit arranged to select the horizontal interval into which the identifying code is to be inserted. In this manner, transmission of a code signal of frequency $f_1$, for example, in horizontal interval $S_1$ may indicate that transmission of civil defense information will follow in a succeeding horizontal interval $S_2$, such as, for example, the next succeeding horizontal interval while transmission of a code signal of frequency $f_2$ in that $S_1$ interval may indicate that transmission of stock market information will be forthcoming in the succeeding horizontal interval $S_2$. Transmission of frequencies $f_3$, $f_4$, etc. in interval $S_1$ may indicate that transmission of other types of auxiliary information are next. The message code generated and the interval into which it is inserted can be manually controlled at the television studio by the broadcaster according to a predetermined schedule of horizontal interval allocations. As will become clear hereinafter, a televiewer desirous of displaying one type of message information to the exclusion of all others may do so by addressing his receiving unit to respond only to the presence of a particular code signal located in its assigned horizontal interval according to this schedule.

It is also possible to automatically control at the studio the message code generated and the horizontal space in the vertical blanking interval into which the message line information is to be inserted. Thus, referring to FIGURE 2, a message category detector 46, comprising an array of photodetector devices and matrix switching arrangements, for example, can be aligned to scan coded segments of the moving message 36, with each such segment corresponding to a different type of message information. Upon recognizing the presence of each such coded segment, the category detector 46 develops an output signal to control the position in the vertical blanking interval of the enabling signals generated within the line selector unit 40 and the frequency or pulse position of the code signal generated within unit 42. The pictorial insert adjacent the message 36 in FIGURE 2 may represent an instantaneous portion of the moving message 36 as it is drawn in front of the pick-up unit 34. The line A in the insert represents that line of the message 36 scanned by the unit 34 which will be inserted into the vertical blanking interval of the program signal by unit 40 while the position of a light reflecting strip B, for example, indicates that the message is one of civil defense information. Position of the strip at C may, for example, indicate the message as being one of disaster control information. As indicated in the insert different positions of the light reflecting strips or different combinations thereof represent different categories of message information. The strips are located at one side of the desired message, and extend along the entire length thereof.

The message line selector units 40 and 44 in this construction are respectively timed to generate an enabling pulse, equal in length to one horizontal line, at the time of the horizontal space in the vertical blanking interval during which the single line video message signal and the identifying code signal are to be added to the program video signal. Since the line selectors 40 and 44 and the television studio equipment 14 operate from the same synchronizing generator 10, a locked or fixed relation is maintained between the two video signals and the code signal. Once units 40 and 44 are set to select a particular horizontal space in the vertical blanking interval, therefore, they continue to select that space for all successive vertical blanking intervals.

Figure 3:
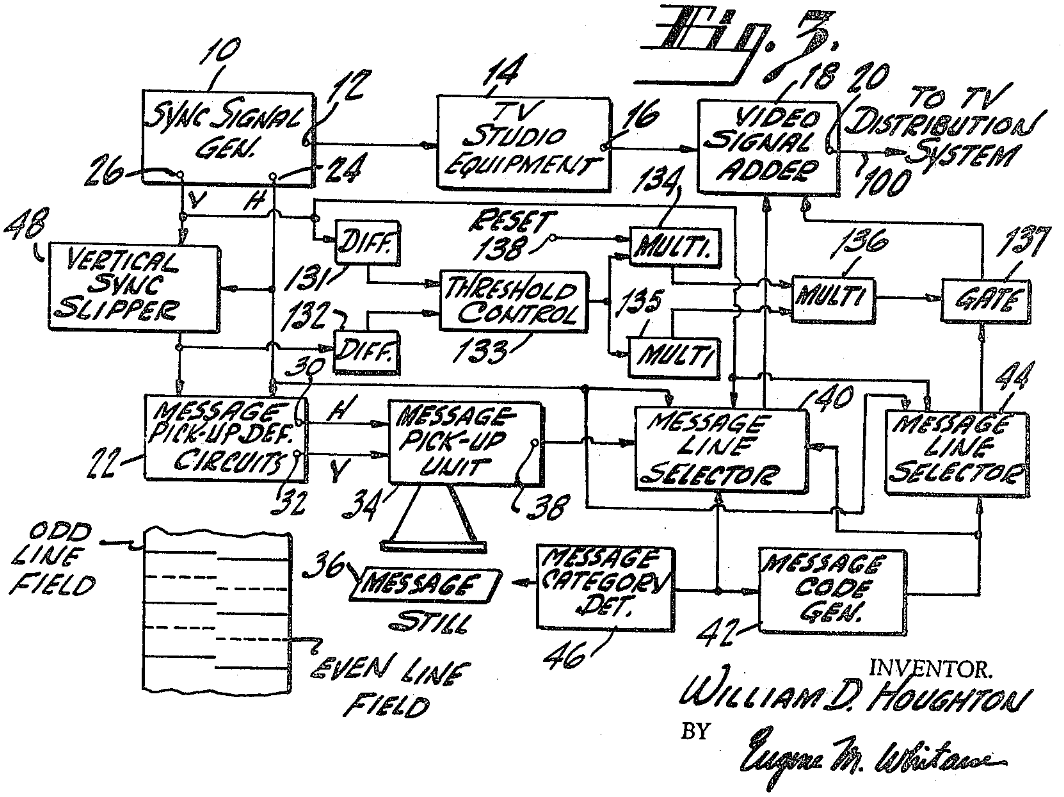
FIGURE 3 is a block diagram showing another such transmitting portion arrangement.

Referring now to FIGURE 3, there is shown an arrangement for the transmitting portion of a television message system in which the message is stationary rather than moving as in FIGURE 2. The operation of this arrangement is basically the same as that for FIGURE 2 and, therefore, those units in FIGURE 3 which operate in the same manner as similar elements in FIGURE 2 have been assigned the same reference notations.

In FIGURE 3, single line video message signals are injected into predetermined horizontal spaces of the vertical blanking interval through the action of a vertical synchronizing frequency slipper 48 rather than through the action of a vertical synchronizing pulse phase shifter 28 as in FIGURE 2. As shown in FIGURE 3, the vertical synchronizing pulses develop at output terminal 26 of the synchronizing signal generator 10 are coupled to the vertical deflection signal generator in unit 22 through the sync slipper 48. The horizontal synchronizing pulses developed at output terminal 24 of the generator 10 are also coupled to the sync slipper 48.

The vertical synchronizing frequency slipper 48 of FIGURE 3 is selected to provide a slip of exactly one horizontal line per interlaced television field between the vertical deflection for the studio equipment unit 14 and the vertical deflection for the message pick-up unit 34. This might be characterized as follows: in the first field interval, the electron beam in unit 14 might be scanning line 1 of its field at a time $t_1$ while the electron beam in unit 34 might be scanning line 1 of its field; in the second field interval, the electron beam in unit 14 would again be scanning line 1 of its field but the electron beam in unit 34 would be scanning line 2 of its field; in the third field interval, the electron beam in unit 14 would again scan line 1 of its field but the electron beam in unit 14 would this time be scanning line 3 of its field. This one line per field vertical slip may be accomplished by doubling the frequency of the 15,750 cycle horizontal synchronizing pulse from output terminal 24 of the synchronizing signal generator 10 to a 31,500 cycle pulse signal and dividing the result by 524. Or, it may be accomplished by a heterodyne arrangement in which the 15,750 cycle horizontal synchronizing pulse is mixed in a double balanced modulator with the 60 cycle vertical synchronizing pulse from output terminal 26 of the generator 10 to produce a 15,810 cycle pulse signal. The frequency of this signal is then doubled to a 31,620 cycle pulse signal and divided by 525 to give a 60.229 cycle pulse signal. This is the vertical pulse signal that is required for a line-per-television field slip frequency.

The synchronizing signal generator 10, the sync slipper 48, the message line selector 40 (either manually controlled by the broadcaster or automatically controlled by the stationary message 36 and the message category detector 46), and the message line selector 44 provide the timing signals needed to inject the singl line video message lines and the category code signal into the horizontal spaces in the vertical blanking portion of a program video signal to which the particular message information and category code are assigned. Synchronization between the program video signal, the single line video message signal and the message code is maintained as described with respect to the transmitting arrangement of FIGURE 2.

It will be noted that with a vertical synchronizing frequency slipper which slips at a rate of one horizontal line per field of television information, only 262.5 lines of a 525 line message frame will be scanned by the message pick-up unit 34 and transmitted over the airways. This is due to interlace at the pick-up unit 34 and is of such a nature that only every other line of each television field will be transmitted, as illustrated, for example, by the insert adjacent to the message 36 in FIGURE 3 wherein the solid line of each field portion represents that line which will be selected for transmission while the dashed line of each field portion represents that line which will not be selected for transmission. This is to be contrasted with the vertical synchronizing pulse phase shifter arrangement of FIGURE 2 wherein each line of the message frame is drawn before the active scanning area, converted into a video signal, and transmitted by virtue of the controlled movement of the message 36. As will subsequently become clear, with certain types of receiving units the lowered line resolution which results due to the action of the slipper 48 will not prove to be objectionable. If greater vertical resolution is required, the unit 48 can be selected to provide a slip at the rate of one horizontal line per television frame, instead of one line per field. In such a situation, the synchronizing slipper unit 48 would be arranged to produce a 60.458 cycle pulse signal, in a manner similar to that for producing previous 60.229 cycle slip signal.

Also included in the arrangement of FIGURE 3 is apparatus to ensure that the transmission of the message video signal and code information starts in synchronism with the program video signal. This apparatus includes the differentiator circuits 131 and 132, the threshold control circuit 133, the multivibrators 134, 135 and 136, the gate circuit 137 and the reset control terminal 138. Differentiators 131 and 132 operate from the vertical synchronizing pulse and slipped vertical synchronizing pulse respectively to develop pulse spikes which will add together and pass through the threshold control circuit 133 substantially only at the beginning of a field interval, i.e., when those pulses are most nearly in time coincidence. Multivibrators 134, 135 and 136 are initially in their "ON," "OFF" and "OFF" states respectively. Upon receipt of the trigger pulse through control circuit 133, multivibrator 134 is switched "OFF," which in turn switches multivibrators 135 and 136 "ON." The category code signal from generator 42 is thus coupled through the gate circuit 137, now enabled by multivibrator 136, into the horizontal interval determined by the line selector unit 44. Coincidence of the vertical and slipped vertical synchronizing pulses at the beginning of the next field interval produces a trigger pulse which will turn multivibrators 135 and 136 back to their initial "OFF" conditions and inhibit the gate circuit 137. A pulse signal is then applied to terminal 138 to reset multivibrator 134 to its initial "ON" condition, to prepare the apparatus for the next field interval. It will be understood that the scheme just described is intended for use with a transmitter arrangement in which a slip of one line per field is provided. A similar gating scheme could be used where a line per frame slip is provided.

Figure 4:
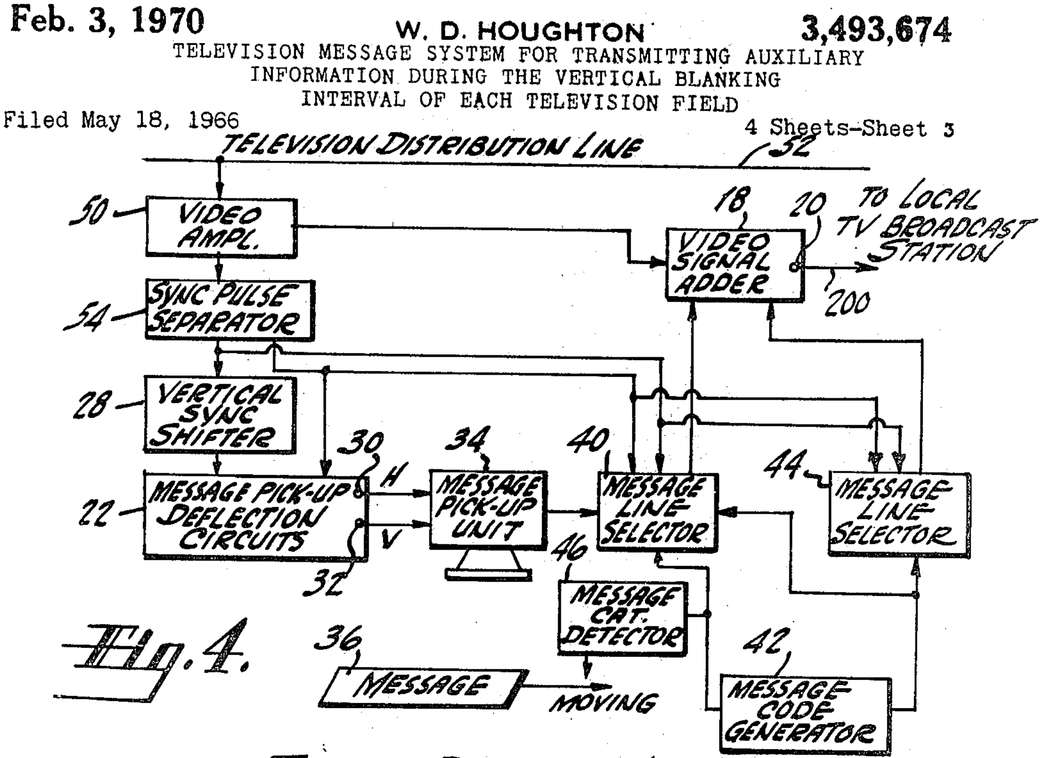
FIGURE 4 is a block diagram showing another arrangement for the transmitting portion of the message system for use at a point remote from the television studio where the program video signal originates.

Referring now to FIGURE 4, there is shown an arrangement for a pick-up unit that may be used at any remote point along a television distribution network. The operation of this arrangement is basically the same as that for FIGURE 2. Those units in FIGURE 4 which operate in the same manner as similar elements in FIGURE 2 have therefore, been assigned the same reference notation.

In FIGURE 4, a video amplifier 50 bridges the television distribution line 52 to provide a means for coupling the program video signal to a synchronizing pulse separator 54 and, also, to the video signal adder 18. The synchronizing pulse separator 54 selects the composite synchronizing signal from the program video and couples the vertical and horizontal components thereof to the message line selector 40 for production therein of the enabling pulse timed to coincide with the horizontal space during the vertical blanking interval into which the message lines are to be added. If desired the synchronizing signal separator 54 may be coupled to lock a local synchronizing signal generator, not shown, which in turn provides the required pulses.

The synchronizing pulse separator 54 also couples a horizontal synchronizing pulse to the horizontal deflection circuits in unit 22 and a vertical synchronizing pulse to the vertical synchronizing pulse phase shifter 28. The horizontal synchronizing pulse coupled to the unit 22 provides a means for tightly locking the timing of the horizontal line in the video message signal developed by the message pick-up unit 34 with the horizontal lines in the program signal developed by the studio equipment 14. The vertical synchronizing pulse coupled to the vertical sync shifter 28 is delayed therein by such an amount that it will be in time coincidence with the properly focused video message line from the pick-up unit 34 having the information desired to be transmitted (line 100, for example). That video message line is then gated into the selected horizontal space in the vertical blanking interval by the action of unit 40 and the transmission of different message information during each field interval is effected by the controlled movement of the message 36.

This arrangement, like those of FIGURES 2 and 3, introduces the message signal into the program video signal at a rate of one line per field. This arrangement, however, is intended for local rather than network use. The resulting signal developed by the video signal adder 18 at its output terminal 20 is, therefore, coupled along a cable 200 to the local television broadcast station rather than to the television signal distribution network, as with FIGURES 2 or 3. The message 36 represents in this arrangement, information of interest to the local viewing audience—weather forecasts, traffic conditions, theatre timetables, etc.

It will be appreciated that although shown using the set up for a moving message type of system, the arrangement of FIGURE 4 might just as well have been shown using the set up for a stationary message transmitting system. The principles of the FIGURE 4 arrangement will apply equally as well in either situation.

Figures 5, 9:
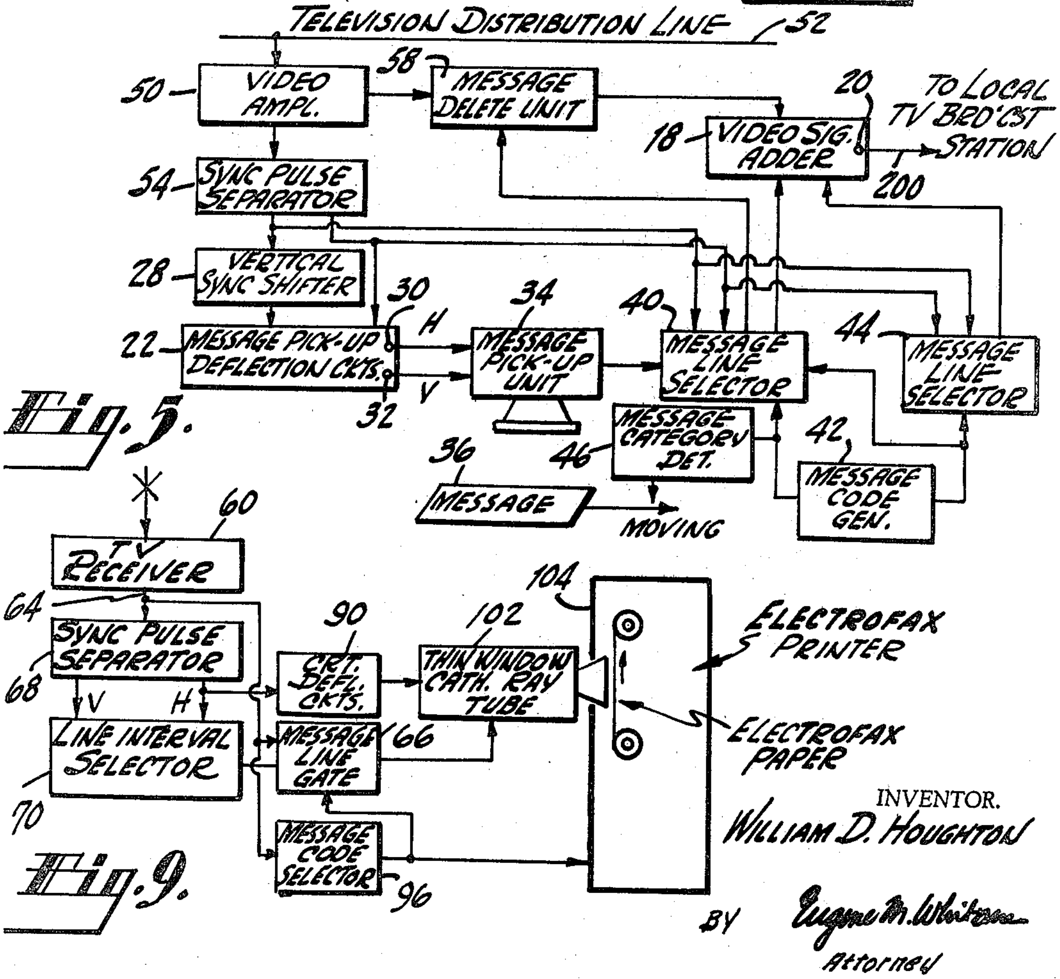
FIGURE 5 is a block diagram of an arrangement for removing at one location a message signal introduced at another location along a network and for inserting thereat a new message signal in its place.
FIGURE 9 is a block diagram showing still another such permanent display-receiving portion arrangement.

Referring to FIGURE 5, there is shown an arrangement for removing at one location, a message signal introduced at another location along a network and for inserting thereat a new message signal in its place. As will be readily apparent, this arrangement is quite similar to the transmitting arrangement of FIGURE 4. Those units in FIGURE 5 which operate in the same manner as similar elements in FIGURE 4 have, therefore, been assigned the same reference notations.

In FIGURE 5, a message line deleter unit 58 is added and connected between the video amplifier 50 and the video signal adder 18. Unit 58 is basically a gated amplifier unit and is controlled as shown, by the timing pulses developed by the message line selector 40. When so controlled, unit 58 can be used to delete any message information that might exist in a horizontal space within the vertical blanking interval portion of the composite signal, as well as to prepare for insertion of different message information from line selector unit 40 in its stead. The message line deleter 58 can be constructed to delete the message information from any of the horizontal spaces within the blanking interval.

Figures 6, 7, 8:
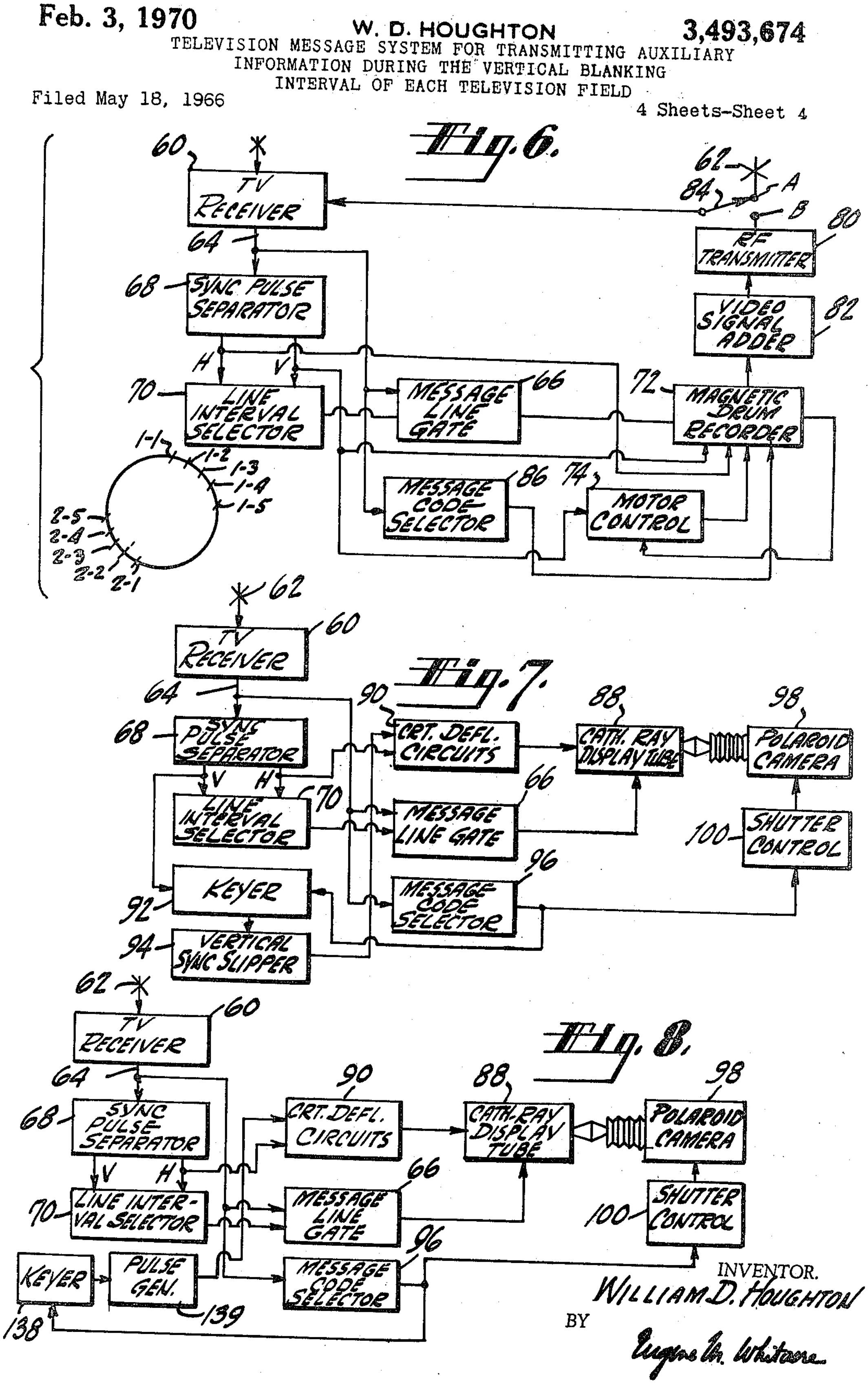
FIGURE 6 is a block diagram showing one arrangement for the receiving portion of the message system which produces a transient display of the transmitted message signal.
FIGURE 7 is a block diagram showing one arrangement for the receiving portion of the message system which produces a permanent display of the transmitted message signal.
FIGURE 8 is a block diagram showing another such permanent display-receiving portion arrangement.

Referring to FIGURE 6, there is shown one arrangement of the receiver portion of the television message system. As was previously mentioned, such an arrangement generally operates to select the individual video message lines from the composite video signal transmitted and to sequentially store each of the selected lines in a memory network. When the transmission is complete, i.e., when all of the lines comprising the message have been received and stored in memory, the arrangement then operates to display the entire message. In FIGURE 6, the receiving unit is one which will produce a transient type display of a stationary auxiliary message on a television receiver screen.

Thus, referring to FIGURE 6 now in more detail, a television receiver 60 is included and modified slightly so as to make the video signal received via antenna 62 available on an output conductor 64. This video signal, including the program portion and the message portion, is coupled to a message line gate unit 66 and to a synchronizing pulse separator 68. The synchronizing pulse separator 68 selects the horizontal and vertical synchronizing signal components from the video signal components on conductor 64 and couples them to a line interval selector unit 70. The line interval selector operates from the vertical and horizontal synchronizing components from the separator 68 to produce a gate pulse set to coincide with any one horizontal space in the vertical blanking interval of the video signal including the one that contains the added video message lines.

The message line gate unit 66 utilizes the pulses from the line interval selector 70 to operate a gate circuit included therein which selects the video message lines from the composite video signal present on conductor 64 and coupled to gate unit 66. These message line signals are then coupled from the gate unit 66 to a magnetic drum recorder 72 to key "ON" the recording circuits for the drum 72 for the duration of each of the message lines so as to be stored thereon. The horizontal and vertical synchronizing signals developed by the synchronizing signals developed by the synchronizing signal separator 68 are also coupled to the drum recorder 72 to be stored on a separate track of the drum.

The vertical synchronizing signals developed by the separator 68 are also coupled to a motor control unit 74. Unit 74 develops control pulses in response to the vertical synchronizing signal components and couples these pulses to the drum 72 to regulate its speed of rotation. More specifically, motor control unit 74 operates, with a feedback signal speed indicator from the drum 72, to maintain a desired timing relationship between the drum rotation and the video message lines so that each successive message line transmitted per odd line field and per even line field of television message information is received and added to the end of the preceding message line associated with that field. This is illustrated by the insert of FIGURE 6 where 1–1, 1–2, 1–3, 2–1, 2–2, 2–3 respectively signify the position on the circumference of the drum 72 of the first line of one message field, the second line of that field, the third line of the field, the first line of the second interlaced message field, the second line of that field, the third line of the field etc. Where the transmitting portion of the television message system, such as that shown for a stationary message in FIGURE 3 for example, includes a vertical synchronizing frequency slipper which provides a slip of one horizontal line per television frame, this positioning is accomplished by rotating the drum 72 at a rate of 1800 revolutions per minute; where it includes a synchronizing slipper unit which provides a slip of one horizontal line per interlaced field, this positioning is also accomplished by rotating the drum 72 at a rate of 1800 revolutions per minute.

As shown in FIGURE 6, the video signal generated by the drum recorder 72 on playback is coupled to an RF transmitter 80 via a signal adder unit 82. The vertical and horizontal signals stored on the drum 72 are also coupled to the transmitter 80 to insure proper television interlace and subsequent display at the standard television frame rate of 30 cycles per second. The output of the transmitter 80 is connected to one contact of a switch 84. With the switch 84 thrown in its A position, the viewer will observe the normal television program on the screen of his receiver 60. To view the added message, all the viewer need do is throw the switch to its B position, to connect the output of the drum recorder 72 to the television receiver 60 via the adder 82 and the transmitter 80. The horizontal and vertical synchronizing signal components contained in the stored signals provide the signals necessary to synchronize properly the operation of the television receiver 60.

A message code selector unit 86 may also be included within the receiving arrangement of FIGURE 6 to additionally control the recording circuits for the drum 72. More particularly, the message code selector 86 is connected between the conductor 64 and the drum 72 and is a unit which is arranged to produce an enabling pulse for the recording circuits in response to the presence, in the composite video signal on the conductor 64, of a code signal selected according to a schedule of message information code, indicating the desired message to be stored and displayed. This enabling pulse is set to be of sufficient duration to key "ON" the recording circuits of the drum 72 during the transmission of the auxiliary message information. In the absence of the code signal, no enabling pulse will be generated for the recording circuits of the drum 72 and, in this environment, no message information will be written into the drum memory.

By having a magnetic drum memory unit capable of multiple track recording, many messages may be stored. For example, with a drum 6″ in width, 10″ in diameter, and having a density of 20 tracks per inch, 120 different messages may be stored for future viewing for a rotational recording speed of 1800 revolutions per minute.

Referring to FIGURE 7, there is shown a receiving arrangement which will produce a hard copy permanent print of a stationary auxiliary television message. Those units in FIGURE 7 which operate in the same manner as similar elements in FIGURE 6 have been assigned the same reference notations.

In FIGURE 7, the television receiver 60 once again produces a video signal which is coupled to the message line gate unit 66, to a message code selector 96, and to the synchronizing pulse separator 68. The horizontal and vertical synchronizing signal components developed by the separator 68 drive the message line interval selector 70 which develops, in response to these signals, gating pulses which coincide with the horizontal spaces in the vertical blanking interval including the one which contains the added video message line, just as before. The message line gate unit 66 is enabled by these pulses and couples the auxiliary message information present during these spaces to a cathode ray type display tube 88 to develop intensifying signals for the electron beam therein. These intensifying signals are equal in duration to those pulses developed by the line interval selector 70 and, therefore, occur for the times when the message signals are present.

The horizontal and vertical synchronizing signal components developed by the separator 68 also provide the drive signals for a cathode ray tube deflection circuits unit 90 which provides the sweep signals for the electron beam within the display tube 88. As shown in FIGURE 7, the horizontal synchronizing signal components are coupled directly from the separator 68 to the unit 90 whereas the vertical synchronizing signal components are coupled from the unit 68 to the unit 90 via a gate or keyer circuit 92 and a vertical synchronizing frequency slipper 94. The keyer circuit 92 is controlled by a manually adjustable message code selector unit 96 which is arranged to produce a pair of output pulses in response to a code signal selected according to a schedule of message information code transmitted in the composite video signal, and indicating that the message desired to be displayed on the screen of the tube 88 is being received. The message code selector 96 is so arranged that the first of these pulses exists for a time period corresponding to that of a television field interval while the duration of the second pulse corresponds to the time period of a horizontal space in the vertical blanking interval of the video signal. The first of these pulses is applied to the keyer circuit 92, and thereby permits the vertical synchronizing signal components from separator 68 to reach the sync slipper 94. This unit 94 is arranged to provide a slip of exactly one horizontal line per television field or per television frame depending on the corresponding unit included in the transmitting portion of the message system and is constructed and operates in a similar manner. The vertical and horizontal deflection of the electron beam within the display tube 88 is thus locked to the corresponding deflection of the message pick-up unit (34 in FIGURE 3, for example) so that each successive message line is displayed on the tube 88 just below the previous line.

A Polaroid camera 98 is also included within FIGURE 7 and is operated by a shutter control unit 100 which exposes the Polaroid film to the successive message lines. The control unit 100 operates in response to the second gating pulse developed by the message code selector 96 and produces a pulse which opens the camera shutter for the duration of the message transmission. That is, since the cathode ray tube screen is dark except when a message line is being displayed, and since the message lines are located one below the other, the camera shutter may be opened at the start of the message transmission and left open until the entire message is received, at which time it is closed by the control unit 100. In the absence of the desired code signal, it will be noted that there is no enabling pulse developed by selector 96 for the shutter control 100 so that no exposure of the Polaroid film results.

Referring to FIGURE 8, there is shown a receiving arrangement which will produce a hard copy permanent print of an auxiliary television message which is physically moved past the studio camera. Those units in FIGURE 8 which operate in the same manner as similar elements in FIGURE 7 have therefore been assigned the same reference notations.

In FIGURE 8, the television receiver 60, the synchronizing pulse separator 68, the line interval selector 70, and the message line gate unit 66 cooperate as in the arrangement of FIGURE 7 to bring the cathode ray display tube 88 out of cut off during the time intervals when the message signals are present in the received program signal. The receiver 60 and the sync pulse separator 68 similarly cooperate to provide the horizontal synchronizing drive pulses for the deflection circuits unit 90. The vertical synchronizing drive pulses for the unit 90 are derived from a pulse generator 138 gated into operation by a keyer circuit 139 controlled by the enabling pulse developed by the message code selector unit 96 in response to the video signal from the television receiver 60. It will be noted that in this moving message system context, the drive pulses developed by the generator 139 will be of such timing so as to cause unit 90 to vertically deflect the electron beam in the display tube unit 88 at the same scan rate as that rate at which the moving message is drawn before the auxiliary message camera at the transmitter, as for example in FIGURE 2. The enabling pulse developed by the selector unit 96 is also coupled to the unit 100 to control the camera shutter.

Referring now to FIGURE 9, there is shown an additional receiving arrangement which will produce a hard copy print of a moving auxiliary television message. Those units in FIGURE 9 which operate in the same manner as similar elements in FIGURE 8 have been assigned the same reference notations.

In FIGURE 9, a thin window type cathode ray tube unit 102 is used for the cathode ray tube unit 88 of FIGURE 8 and an Electrofax printer 104 replaces the Polaroid camera 98. The thin window tube 102 displays only one horizontal line at a time, and its associated circuits can be gated to display each horizontal line of the message as it is received while the Electrofax printer 104 continuously advances the paper so that each message line is written below the previous line. Here too, the message code selector unit 96 conditions and actuates the message reproducer (the printer 104) when the desired auxiliary information is being picked up by the television receiver 60. The selector 96 also conditions the tube 102 so that only desired messages will be reproduced. In this manner, a complete message can be formed and stored as a permanent record for future reference. It will be appreciated, however, that since this record can be made continuous, a moving message having any number of lines can be used, thereby extending the system beyond the usual 525 line limit.

The receiving arrangement shown in FIGURE 9 can also be used to produce a permanent print of an auxiliary television message which does not move relative to the studio camera. The vertical synchronizing frequency slipper provided in a corresponding transmitting arrangement (as for example that of FIGURE 3) could, as was previously mentioned, be one in which a slip of exactly one horizontal line per interlaced television field between the vertical deflections for the primary and auxiliary pick-up units 14 and 34.

Figure 10:
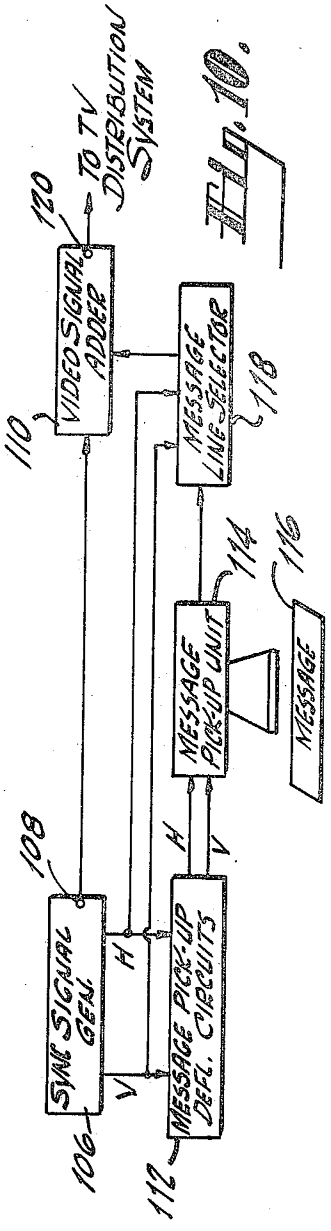
FIGURE 10 is a block diagram showing an additional arrangement for the transmitting portion of a message system embodying the invention.

Referring now to FIGURE 10, there is shown a transmitting arrangement of another message system embodying the principles of the invention. In this arrangement, the auxiliary message information is once again sent out over the air ways at a rate of one line of message at a time, but differs from those arrangements previously described in that this information is transmitted during the picture interval of the television signal rather than during its vertical blanking interval.

In FIGURE 10, a synchronizing signal generator 106 develops and provides at its output terminal 108 the standard horizontal and vertical rate drive pulses, which are then coupled to a video signal adder unit 110. These drive pulses are also coupled to a message pick-up deflection circuits unit 112 which develops the necessary horizontal and vertical sweep signals for a message pick-up unit 114 of the type commonly used in television practice. The unit 114 develops video signals representative of the message 116 upon which it is focused and couples them through a message line selector unit 118 to the video signal adder 110 for combination with the horizontal and vertical synchronizing signals before transmission over the air ways. The sync generator 106, the video adder 110, the deflection circuits unit 112, and the message pick-up unit 114 may each be identical to corresponding units in the transmitting arrangement of FIGURE 2. The message line selector unit 118, on the other hand, differs from that of FIGURE 2 in that it is arranged to inject each line of auxiliary information into an active line interval of the video signal rather than into the vertical blanking interval. This is illustrated in FIGURE 10 by the coupling of the horizontal synchronizing pulses as well as the vertical synchronizing pulses from generator 106 to the message line selector 118, which unit 118 is arranged to count from the vertical synchronizing pulse as a reference to the active line in the field interval into which the insertion is desired. The particular active line into which this information is inserted can be selected, as was previously described, either by manual control of the gating sequence in unit 118 by the broadcaster or by automatic action in response to a category coded message. Where such a coding scheme is present, a message category detector and a message code generator, similar to and connected as corresponding units in FIGURE 2, for example, may be included.

The receiving arrangements of FIGURES 8 and 9 are particularly suited for use with the transmitting arrangement of FIGURE 10.

The transmitting arrangement of FIGURE 10 lends itself quite readily to use in an educational television network system in that many different types of coded educational information can be transmitted. The televiewer can select the one of particular interest to him by adjusting his home message code selector to permit display only of the information desired.

Such a transmitting arrangement, however, is not compatible with existing television equipments in that it uses those active lines for the auxiliary message as are used for the primary program information. It will be readily apparent to those skilled in the art that a simple switching scheme could be added to the arrangement of FIGURE 10 so that the television studio equipment unit 14 and the vertical synchronizing pulse phase shifter 28 of FIGURE 2, for example, can be switched into the arrangement of FIGURE 10 when normal television transmission is desired aind switched out of the arrangement when it is desired to transmit this auxiliary type information.

The arrangement of FIGURE 10 is also suitable for use with an unused channel in a community antenna television system or with an unused channel in a closed circuit educational system.

It will be noted that whereas the message code selector 86 in the receiving arrangement of FIGURE 6 controlled the storing on the magnetic drum 72 of the separated video message signals and whereas the message code selector 96 in the receiving arrangements of FIGURES 7–9 controlled the displaying of the separated video message signals, similar selector units could be used to control the separation of only those message signals associated with the transmitted code. The message line gate unit 66 i neach of these figures would, in such a case, be additionally controlled by the enabling pulse developed by the code selector in response to the transmitted code signal.

It can easily be shown that 8.75 seconds are required to transmit an entire 525 line message when the message information is added at the rate of one line per television field. This permits 6.8 messages to be transmitted per minute, or over 400 messages per hour. Since network test signal operations have shown that at least three horizontal spaces may be used without interfering with normal program viewing, then at least 1200 messages per hour can be carried on the program video signal without disturbing the television viewer. For this operation, three messages would be transmitted simultaneously by using three separate horizontal spaces in each vertical blanking interval. If, in the future, all television receivers contain vertical retrace blanking networks, then at least 10 spaces may be used for the message service, to provide a message rate of over 4000 per hour.

In fact, 13 spaces are available for use in each vertical blanking interval for the added transmission. Each space corresponds to the space between the horizontal synchronizing pulses thereof. Any one, or all, or any combination of these pulses could be used simply by selecting the proper number and position within the vertical blanking interval of the enabling pulses generated within the message line selector unit of the transmitting portion of the message system.

While the previous transmitting and receiving arrangements have been described as using a message and code signal insertion scheme by which a code signal was inserted into one horizontal space in a vertical blanking interval and the message signal inserted into a later space in that same interval, these arrangements could just as easily operate where the message signal is inserted in the same horizontal space as the identifying code, but in later blanking intervals. Thus, a transmission of a code signal of frequency $f_1$, for example, in horizontal space $S_1$ may indicate that transmission of civil defense information will follow in that space in later intervals whereas transmission of a code signal of frequency $f_2$ in that space may indicate that transmission of stock market information will be forthcoming. With such an arrangement, only one message line selector unit 40, would be required in FIGURES 2–5, representing a cost savings and simplification of the overall system. It will be appreciated, however, that such simplification also reduces the number of identifying codes available for use.

What is claimed is:

1. A television message system for transmitting and receiving fields of image information including video signals and synchronizing signals comprising:

first means for generating line scan video signals representative of message image information and for sequentially multiplexing said line scan signals at least with said synchronizing signals to form composite television signals for transmission;

and second means for separating a predetermined line scan video signal present in each received composite television signal and for displaying said separated signals;

the multiplexing of said line scan video signals and the separating of said line scan signals being performed at a rate of one line scan signal per message per field of image information.

2. A television message system as defined in claim 1 wherein said message information is stationary with respect to said first means.

3. A television message system as defined in claim 1 wherein said message information is moving with respect to said first means.

4. A television message system for transmitting and receiving fields of image information including video signals and synchronizing signals comprising:

first means for generating line scan video signals representative of message image information and category code signals identifying said information as to type, and for sequentially multiplexing said line scan signals at least with said synchronizing signals to form composite television signals for transmission with said category code signals;

second means responsive to said code signals for displaying the line scan video signal present in each received composite television signal associated with said identifying code; and wherein the multiplexing of said line scan video signals at least with said synchronizing signals is performed at a rate of one line scan signal per message per field of image information.

5. A television message system for transmitting and receiving fields of image information including video signals and synchronizing signals comprising:

first means for generating line scan video signals representative of message image information and category code signals identifying said information as to type, and for sequentially multiplexing said line scan signals at least with said synchronizing signals to form composite television signals for transmission with said category code signals;

and second means responsive to said code signals for separating the line scan video signal present in each received composite television signal associated with said identifying code and for displaying said separated signals;

the multiplexing of said line scan video signals and the separating of said line scan signals being performed at a rate of one line scan signal per message per field of image information.

6. A television message system for transmitting and receiving fields of image information including video signals and synchronizing signals comprising:

first means for generating line scan video signals representative of message image information and category code signals identifying said information as to type, and for sequentially multiplexing said line scan signals at least with said synchronizing signals to form composite television signals for transmission with said category code signals;

and second means for separating the line scan video signal present in each received composite television signal, for storing, in response to said code signals, those separated line scan signals associated with said identifying code, and for displaying said stored signals;

the multiplexing of said line scan video signals and the separating and storing of said line scan signals being performed at a rate of one line scan signal per message per field of image information.

7. A television message system for transmitting and receiving fields of image information including video signals and synchronizing signals comprising:

first means for generating line scan video signals representative of message image information and category code signals identifying said information as to type, and for sequentially multiplexing said line scan signals at least with said synchronizing signals to form composite television signals for transmission with said category code signals;

and second means for separating the line scan video signal present in each received composite television signal and for displaying, in response to said code signals, those separated line scan signals associated with said identifying code;

the multiplexing of said line scan video signals and the separating and displaying of said line scan signals being performed at a rate of one line scan signal per message per field of image information.

8. A television message system for transmitting and receiving video signals representative of a primary program television image and of an auxiliary message image comprising:

first means for generating line scan video signals representative of an auxiliary message image and for sequentially multiplexing said line scan signals with said primary program video signals during predetermined portions of the vertical blanking interval thereof to form composite television signals for transmission;

and second means for separating a predetermined line scan video signal present in each received composite television signal and for displaying said separated signals;

the multiplexing of said line scan video signals and the separating of said line scan signals being performed at a rate of one line scan signal per message per field of primary program television information.

9. A television message system for transmitting and receiving video signals representative of a primary program television image and of an auxiliary message image comprising:

first means for generating line scan video signals representative of an auxiliary message image and category code signals identifying said message image as to type, and for sequentially multiplexing said line scan signals with said primary program video signals during predetermined portions of the vertical blanking interval thereof to form composite television signals for transmission with said category code signals;

second means responsive to said code signals for displaying the line scan video signal present in each received composite television signal associated with said identifying code; and wherein the multiplexing of said line scan video signals with said primary program video signals is performed at a rate of one line scan signal per message per field of primary program television information.

10. In a television message systems, apparatus for transmitting fields of image information including video signals and synchronizing signals comprising:

first means for generating at least said synchronizing signals;

second means for generating line scan video signals representative of a message image;

third means for sequentially multiplexing said line scan signals at least with said synchronizing signals and at a rate of one line scan signal per message per field of image information;

and fourth means for transmitting said multiplexed signals.

11. Transmitting apparatus for a television message system comprising:

first means for generating line scan video signals representative of a primary television program image;

second means for generating line scan video signals representative of an auxiliary message image;

third means for sequentially multiplexing said message line signals with said primary program signals during predetermined portions of the vertical blanking interval thereof, and at a rate of one message line signal per field of program information;

and fourth means for transmitting said multiplexed signals, including the synchronizing pulses of said vertical blanking interval.

12. Transmitting apparatus for a television message system as defined in claim 11 wherein there is also included fifth means for generating category code signals identifytem of the type wherein there are transmitted fields of image information at least including synchronizing signals and line scan video signals representative of message image information sequentially multiplexed therewith at a rate of one line scan signal per message per field of image information comprising:

first means for receiving said multiplexed signals;

and second means for separating a predetermined line scan video signal from each of said multiplexed signals at said one line scan signal per message per field of image information rate and storage means for storing said separated signals.

18. Receiving apparatus for a television message system of the type wherein there are transmitted fields of image information at least including synchronizing signals, line scan video signals representative of message image information sequentially multiplexed therewith at a rate of one line scan signal per message per field of image information, and category code signals identifying said message image as to type comprising:

first means for receiving said multiplexed signals;

and second means responsive to said code signals for separating and displaying a predetermined line scan video signal present in each multiplexed signal associated with said identifying code, the separating of said line scan video signal from each of said multiplexed signals being performed at said one line scan signal per message per field of image information rate.

19. Receiving apparatus for a television message system of the type wherein the transmitted signal includes primary program image signals and auxiliary message image signals sequentially multiplexed therewith at a rate of one message signal per field of program information and included within predetermined portions of the vertical blanking interval of said program signals comprising:

first means for receiving said multiplexed signals;

second means for separating a predetermined one of said auxiliary message signals from said primary program signals;

third means for storing said separated auxiliary message signals;

and fourth means for displaying said stored signals after completion of the message image transmission;

the separating and storing of said auxiliary message signals being performed at said one message signal per field of program information rate.

20. Receiving apparatus for a television message system of the type wherein the transmitted signal is a sequentially multiplexed signal including primary program image signals, and auxiliary message image signals and category code signals identifying said image signals as to type included within predetermined portions of the vertical blanking interval of said program signals comprising:

first means for receiving said multiplexed signals;

second means for separating a predetermined one of the auxiliary message image signals present in each multiplexed signal;

third means responsive to said code signals for storing those separated auxiliary message signals associated with said identifying code;

fourth means for displaying said stored signals after completion of the message image transmission; and wherein the separating and storing of said auxiliary message signals are performed at a rate of one message signal per field of program information.

21. Receiving apparatus for a television message system as defined in claim 20 wherein said third means also includes means for storing the horizontal and vertical synchronizing signal components of said multiplexed transmitted signal.

22. Receiving apparatus for a television message system as defined in claim 21 wherein said first means includes:

television receiving means for receiving said multiplexed signals and for providing said signals at an output terminal thereof;

wherein said second means includes:

synchronizing pulse separator means coupled to said output terminal for deriving the horizontal and vertical synchronizing signal components from said multiplexed signals and for coupling said components to a magnetic drum memory unit included with said third means to be stored thereon;

pulse forming means responsive to said horizontal and vertical synchroning signal components for developing pulse signals coinciding with the horizontal spaces in the vertical blanking interval of said multiplexed signals which contain the message image signals and for coupling said pulses to said magnetic drum memory unit to enable the recording circuits thereof;

and gating circuit means coupled to said output terminal and controlled by said pulse signals for selecting those message image lines included within said multiplexed signals and for coupling said message signals to said memory unit to be stored therein;

wherein said third means also includes:

message code selector means coupled to said output terminal for developing pulse signals in response to said category code signals for keying on the recording circuits of said memory unit upon reception of message signals associated with said identifying code;

and motor control means responsive to the vertical synchronizing signal components derived by said synchronizing pulse generator for regulating the speed of rotation of said memory drum to successively store message signals received in alternate fields of program information in a continuous track around said drum;

and wherein said fourth means includes:

video signal adder means for multiplexing the message signals stored around said drum with the horizontal and vertical synchronizing signal components stored thereon;

radio frequency transmitting means for transmitting said stored multiplexed message signals;

and switching means coupled between an output terminal of said transmitting means and the telvision receiving means of said first means for switching said receiving means to said transmitting means to provide a transient display of said stored signals after completion of the message transmission.

23. Receiving apparatus for a television message system of the type wherein the transmitted signal includes primary program image signals and auxiliary message image signals sequentially multiplexed therewith at a rate of one message signal per field of program information and included within predetermined portions of the vertical blanking interval of said program signals comprising:

first means for receiving said multiplexed signals;

second means for separating a predetermined one of said auxiliary message signals from said primary program signals;

and third means for displaying said separated auxiliary message signals;

the separating and displaying of said auxiliary message signals being performed at said one message signal per field of program information rate.

24. Receiving apparatus for a television message system of the type wherein the transmitted signal is a sequentially multiplexed signal including primary program image signals, and auxiliary message image signals and category code signals identifying said image signals as to type including within predetermined portions of the ing said auxiliary message image as to type and wherein said fourth means transmits said category code signals with said multiplexed signals.

13. Transmitting apparatus for a television message system as defined in claim 12 wherein
said first means includes:
synchronizing signal generator means for generating horizontal synchronizing rate pulses and vertical synchronizing rate pulses;
and television studio equipment means responsive to said horizontal and vertical synchronizing rate pulses for developing video signals representative of a primary television program image, said video signal including the vertical blanking interval thereof;
wherein said second means includes:
video pick-up means for generating video signals representative of an auxiliary message image which is stationary with respect to said pick-up means;
horizontal deflection signal generator means responsive to said horizontal synchronizing rate pulses for developing horizontal deflection signals for said video pick-up means which are in time synchronism with the horizontal deflection sig- equipment means;
and vertical deflection signal generator means including a vertical synchronizing frequency slipper responsive to said vertical synchronizing rate pulses for developing vertical deflection signals for said video pick-up means which are out of synchronism with the vertical deflection signals developed within said studio equipment means by an amount equal to one video pick-up line scan signal per field of program signal information;
wherein said fourth means includes:
message code generator means responsive to said auxiliary message image for generating category code signals identifying said message image as to type;
and wherein said third means includes:
gating circuit means responsive to said vertical synchronizing rate pulses, to said category code signals, and to said auxiliary message video signals for developing code signals and line scan video signals at times within the vertical blanking interval of said primary program video signals determined by the position of an internally generated gating pulse within an interval equal to said vertical blanking interval;
and video signal adder means for multiplexing said code signals and said line scan video signals with said program video signals during the vertical blanking interval thereof, to develop multiplexed program signals for transmission.

14. Transmitting apparatus for a television message system as defined in claim 12 wherein said vertical deflection signal generator means including said vertical synchronizing frequency slipper develops vertical deflection signals for said video pick-up means which are out of synchronism with the vertical deflection signals developed within said studio equipment means by an amount equal to one video pick-up line scan signal per frame of program signal information.

15. Transmitting apparatus for a television message system as defined in claim 12 wherein
said first means includes:
synchronizing signal generator means for generating horizontal synchronizing rate pulses and vertical synchronizing rate pulses;
and television studio equipment means responsive to said horizontal and said vertical synchronizing rate pulses for developing video signals representative of a primary television program image, said video signal including the vertical blanking interval thereof;
wherein said second means includes:
video pick-up means for generating video signals representative of an auxiliary message image which is moving with respect to said pick-up means;
horizontal deflection signal generator means responsive to said horizontal synchronizing rate pulses for developing horizontal deflection signals for said video pick-up means which are in time synchronism with the horizontal deflection signals developed within said television studio equipment means;
and vertical deflection signal generator means including a vertical synchronizing pulse phase shifter responsive to said vertical synchronizing rate pulses for developing vertical deflection signals for said video pick-up means which are out of phase with the vertical deflection signals developed within said studio equipment means by an amount equal to the order of one-half of one field of program signal information;
wherein said fourth means includes:
message code generator means responsive to said auxiliary message image for generating category code signals identifying said message image as to type;
and wherein said third means includes:
gating circuit means responsive to said vertical synchronizing rate pulses, to said category code signals, and to said auxiliary message video signals for developing code signals and line scan video signals at times within the vertical blanking interval of said primary program video signals determined by the position of an internally generated gating pulse within an interval equal to said vertical blanking interval;
and video signal adder means for multiplexing said code signals and said line scan video signals with said program video signals during the vertical blanking interval thereof, to develop multiplexed program signals for transmission.

16. Apparatus for transmitting fields of image information as defined in claim 12 wherein
said first means includes:
synchronizing signal generator means for generating horizontal synchronizing rate pulses and vertical synchronizing rate pulses;
wherein said second means includes:
video pick-up means for generating video signals representative of an auxiliary message image;
horizontal deflection signal generator means responsive to said horizontal synchronizing rate pulses for developing horizontal deflection signals for said video pick-up means;
and vertical deflection signal generator means responsive to said vertical synchronizing rate pulses for developing vertical deflection signals for said video pick-up means;
and wherein said third means includes:
gating means responsive to said horizontal synchronizing rate pulses, to said vertical synchronizing rate pulses, and to said auxiliary message video signals for developing line scan video signals at times within the active line interval of said field of image information determined by the position of an internally generated gating pulse within an interval equal to said active line interval;
and video signal adder means for multiplexing said line scan video signals with said horizontal and vertical synchronizing rate pulses, to develop multiplexed program signals for transmission.

17. Receiving apparatus for a television message sysvertical blanking interval of said program signals comprising:

first means for receiving said multiplexed signals;

second means for separating a predetermined one of the auxiliary message image signals present in each multiplexed signal;

third means responsive to said code signals for displaying those separated auxiliary message signals associated with said identifying code; and wherein the separating and displaying of said auxiliary message signals are performed at a rate of one message signal per field of program information.

25. Receiving apparatus for a television message system as defined in claim 24 wherein said first means includes:

television receiving means for receiving said multiplexed signals and for providing said signals at an output terminal thereof;

wherein said second means includes:

synchronizing pulse separator means coupled to said output terminal for deriving the horizontal and vertical synchronizing signal components from said multiplexed signals;

pulse forming means responsive to said horizontal and vertical synchronizing signal components for developing pulse signals coinciding with the horizontal spaces in the vertical blanking interval of said multiplexed signals which contain the message image signals;

and gating circuit means coupled to said output terminal and controlled by said pulse signals for selecting those message image lines included within said multiplexed signals and for coupling said message signals to a cathode ray type display tube included within said third means to be displayed thereon;

and wherein said third means also includes:

photographic camera reproducing means focused on the screen of said cathode ray type tube to provide a permanent film record of the individual message lines displayed thereon;

control means for opening the shutter of said camera reproducing means for the duration of the message transmission;

message code selector means coupled to said output terminal for developing first pulse signals in response to said category code signals for actuating said shutter control means upon reception of message signals associated with said identifying code and for developing second pulse signals in response to said code signals for gating a keyer circuit included within said third means upon reception of said identifying code associated message signals, said keyer circuit also being supplied with the vertical synchronizing signal components derived by said synchronizing pulse separator means;

a vertical synchronizing frequency slipper coupled to an output terminal of said keyer circuit for developing vertical synchronizing components which are out of synchronism with the vertical synchronizing signal components of said multiplexed signals coupled thereto via said keyer circuit by an amount equal to one message signal per field of program information;

and means responsive to the horizontal synchronizing signal components derived by said synchronizing signal separator means and to the vertical synchronizing signal components developed by said vertical synchronizing frequency slipper for developing horizontal and vertical deflection signals for said cathode ray type display tube.

26. Receiving apparatus for a television message system as defined in claim 24 wherein said first means includes:

television receiving means for receiving said multiplexed signals and for providing said signals at an output terminal thereof;

wherein said second means includes:

synchronizing pulse separator means coupled to said output terminal for deriving the horizontal and vertical synchronizing signal components from said multiplexed signals;

pulse forming means responsive to said horizontal and vertical synchronizing signal components for devolping pulse signals coinciding with the horizontal spaces in the vertical blanking interval of said multiplexed signals which contain the message image signals;

and gating circuit means coupled to said output terminal and controlled by said pulse signals for selecting those message image lines included within said multiplexed signals and for coupling said message signals to a cathode ray type display tube included within said third means to be displayed thereon;

and wherein said third means also includes:

photographic camera reproducing means focused on the screen of said cathode ray type tube to provide a permanent film record of the individual message lines displayed thereon;

control means for opening the shutter of said camera reproducing means for the duration of the message transmission;

message code selector means coupled to said output terminal for developing first pulse signals in response to said category code signals for actuating said shutter control means upon reception of message signals associated with said identifying code and for developing second pulse signals in response to said code signals for gating a keyer circuit included within said third means upon reception of said identifying code associated message signials, said keyer circuit also being supplied with the vertical synchronizing signal components derived by said synchronizing pulse separator means;

a vertical synchronizing frequency slipper coupler to an output terminal of said keyer circuit for developing vertical synchronizing components of said multiplexed signals coupled thereto via said keyer circuit by an amount equal to one message signal per frame of program information;

and means responsive to the horizontal synchronizing signal components derived by said synchronizing signal separator means and to the vertical synchronizing signal components developed by said vertical synchronizing frequency slipper for developing horizontal and vertical deflection signals for said cathode ray type display tube.

27. Receiving apparatus for a television message system as defined in claim 24 wherein said first means includes:

television receiving means for receiving said multiplexed signals and for providing said signals at an output terminal thereof;

wherein said second means includes:

synchronizing pulse separator means coupled to said output terminal for deriving the horizontal and vertical synchronizing signal components from said multiplexed signals;

pulse forming means responsive to said horizontal and vertical synchronizing signal components for developing pulse signals coinciding with the horizontal spaces in the vertical blanking interval of said multiplexed signals which contain the message image signals;

and gating circuit means coupled to said output terminal and controlled by said pulse signals for selecting those message image lines included within said multiplexed signals and for coupling said message signals to a cathode ray type display tube included within said third means to be displayed thereon;

and wherein said third means also includes:

photographic camera reproducing means focused on the screen of said cathode ray type tube to provide a permanent film record of the individual message lines displayed thereon;

control means for opening the shutter of said camera reproducing means for the duration of the message transmission;

message code selector means coupled to said output terminal for developing pulse signals in response to said category code signals for actuating said shutter control means upon reception of message signals associated with said identifying code;

and means responsive to the horizontal and vertical synchronizing signal components derived by said synchronizing signal separator means for developing horizontal and vertical deflection signals for said cathode ray type display tube.

28. Receiving apparatus for a television message system as defined in claim 24 wherein said first means includes:

television receiving means for receiving said multiplexed signals and for providing said signals at an output terminal thereof;

wherein said second means includes:

synchronizing pulse separator means coupled to said output terminal for deriving the horizontal and vertical synchronizing signal components from said multiplexed signals;

pulse forming means responsive to said horizontal and vertical synchronizing signal components for developing pulse signals coinciding with the horizontal spaces in the vertical blanking interval of said multiplexed signals which contain the message image signals;

and gating circuit means coupled to said output terminal and controlled by said pulse signals for selecting those message image lines included within said multiplexed signals and for coupling said message signals to a thin window type cathode ray display tube included within said third means to be displayed thereon;

and wherein said third means also includes:

Electrofax printing means focused at the screen of said thin window tube to provide a permanent paper record of the individual message lines displayed thereon;

control means for mechanically advancing the Electrofax paper at a predetermined rate;

message code selector means coupled to said output terminal for developing pulse signals in response to said category code signals for keying on the writing circuits of said Electrofax printing means upon reception of message signals associated with said identifying code;

and means responsive to the horizontal synchronizing signal components derived by said synchronizing signal separator means for developing horizontal deflection signals for said thin window type cathode ray display tube.

References Cited

UNITED STATES PATENTS

| | | | |
|---|---|---|---|
| 2,502,213 | 3/1950 | Fredendall et al. | 178—5.6 |
| 2,686,220 | 8/1954 | Sziklai et al. | 178—5.6 |
| 2,874,213 | 2/1959 | Beers | 178—5.6 |
| 3,046,331 | 7/1962 | Gebel | 178—6.8 |
| 3,070,655 | 12/1962 | Stahl | 178—6.8 |
| 3,188,650 | 6/1965 | Schroter. | |

RICHARD MURRAY, Primary Examiner

A. H. EDDLEMAN, Assistant Examiner

U.S. Cl. X.R.

178—6.8

UNITED STATES PATENT OFFICE
CERTIFICATE OF CORRECTION

Patent No. 3,493,674 Dated February 3, 1970

Inventor(x) William D. Houghton

It is certified that error appears in the above-identified patent and that said Letters Patent are hereby corrected as shown below:

Column 17, line 25, after "sig-" insert -- nals developed within said television studio --. Column 22, line 43, "coupler" should read -- coupled --. Column 22, line 45, after "components" insert -- which are out of synchronism with the vertical synchronizing signal components --.

SIGNED AND SEALED

SEP 29 1970

(SEAL)
Attest:

Edward M. Fletcher, Jr.
Attesting Officer

WILLIAM E. SCHUYLER, JR.
Commissioner of Patents